(12) United States Patent
Kim

(10) Patent No.: US 11,404,732 B2
(45) Date of Patent: Aug. 2, 2022

(54) BATTERY PACK

(71) Applicant: Samsung SDI Co., Ltd., Yongin-si (KR)

(72) Inventor: Dae Young Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 367 days.

(21) Appl. No.: 16/303,962

(22) PCT Filed: Mar. 31, 2017

(86) PCT No.: PCT/KR2017/003541
§ 371 (c)(1),
(2) Date: Nov. 21, 2018

(87) PCT Pub. No.: WO2017/204458
PCT Pub. Date: Nov. 30, 2017

(65) Prior Publication Data
US 2020/0321666 A1 Oct. 8, 2020

(30) Foreign Application Priority Data
May 24, 2016 (KR) .......................... 10-2016-0063543

(51) Int. Cl.
H01M 10/613 (2014.01)
H01M 10/6563 (2014.01)
(Continued)

(52) U.S. Cl.
CPC ....... *H01M 10/613* (2015.04); *H01M 10/655* (2015.04); *H01M 10/6551* (2015.04);
(Continued)

(58) Field of Classification Search
CPC ............ H01M 10/613; H01M 10/625; H01M 10/647; H01M 10/655; H01M 10/6551;
(Continued)

(56) References Cited

U.S. PATENT DOCUMENTS 7,968,223 B2  6/2011  Lee et al.
8,304,104 B2  11/2012  Lee et al.
(Continued)

FOREIGN PATENT DOCUMENTS

JP      2012-204129 A   10/2012
KR  10-2006-0102855 A    9/2006
(Continued)

OTHER PUBLICATIONS

International Search Report for corresponding International Application No. PCT/KR2017/003541, dated Jun. 30, 2017, 3pp.

*Primary Examiner* — Ula C Ruddock
*Assistant Examiner* — Mary Grace Byram
(74) *Attorney, Agent, or Firm* — Lewis Roca Rothgerber Christie LLP

(57) ABSTRACT

A battery pack is capable of maximizing or increasing a cooling effect of a module by concurrently performing conduction-type heat dissipation by a heat dissipation member extended from the inside to the outside of the module, and convection-type heat dissipation by a duct and a cooling fan. A battery pack includes: at least one module including a plurality of unit cells, a plurality of spacers between the unit cells, and a module case accommodating the unit cells and the spacers; a plurality of heat dissipation members inserted into the module and extended from the inside to the outside of the module; a duct including an opening and provided at one side of the module; and a cooling fan connected to the opening of the duct.

17 Claims, 12 Drawing Sheets
(1 of 12 Drawing Sheet(s) Filed in Color)

(51) Int. Cl.
H01M 10/6551 (2014.01)
H01M 10/6554 (2014.01)
H01M 10/6557 (2014.01)
H01M 10/6555 (2014.01)
H01M 50/20 (2021.01)
H01M 10/655 (2014.01)

(52) U.S. Cl.
CPC ... H01M 10/6554 (2015.04); H01M 10/6555 (2015.04); H01M 10/6557 (2015.04); H01M 10/6563 (2015.04); H01M 50/20 (2021.01)

(58) Field of Classification Search
CPC ......... H01M 10/6554; H01M 10/6555; H01M 10/6557; H01M 10/6561; H01M 10/6562; H01M 10/6563; H01M 10/6566; H01M 2/10; H01M 2/1016; H01M 2/1077; H01M 2220/20
See application file for complete search history.

(56) References Cited

U.S. PATENT DOCUMENTS

| | | | |
|---|---|---|---|
| 8,623,537 B2 | 1/2014 | Kim et al. | |
| 9,246,200 B2 | 1/2016 | Kang et al. | |
| 9,564,666 B2 | 2/2017 | Sohn | |
| 2006/0216582 A1 | 9/2006 | Lee et al. | |
| 2007/0031728 A1* | 2/2007 | Lee | H01M 10/6557 429/120 |
| 2011/0045333 A1 | 2/2011 | Kim et al. | |
| 2012/0094166 A1 | 4/2012 | Lee et al. | |
| 2012/0231316 A1 | 9/2012 | Sohn | |
| 2013/0216888 A1* | 8/2013 | Shimura | H01M 10/61 429/120 |
| 2013/0244066 A1 | 9/2013 | Kang et al. | |
| 2014/0308559 A1* | 10/2014 | Hwang | H01M 10/6563 429/120 |
| 2015/0024253 A1* | 1/2015 | Noh | H01M 2/1016 429/156 |
| 2015/0207188 A1* | 7/2015 | Choi | H01M 10/6552 429/82 |
| 2016/0028131 A1 | 1/2016 | Lee | |
| 2017/0301964 A1* | 10/2017 | Murakami | H01M 10/643 |

FOREIGN PATENT DOCUMENTS

| | | |
|---|---|---|
| KR | 10-2011-0018810 A | 2/2011 |
| KR | 10-1071537 B1 | 10/2011 |
| KR | 10-2012-0075431 A | 7/2012 |
| KR | 10-2012-0076752 A | 7/2012 |
| KR | 10-2012-0102344 A | 9/2012 |
| KR | 10-2015-0000725 A | 1/2015 |
| KR | 10-2015-0014574 A | 2/2015 |
| KR | 10-2016-0013759 A | 2/2016 |

* cited by examiner

BATTERY PACK

CROSS-REFERENCE TO RELATED APPLICATION(S)

This application is a National Phase Patent Application and claims priority to and the benefit of International Application Number PCT/KR2017/003541, filed on Mar. 31, 2017, which claims priority to and the benefit of Korean Patent Application No. 10-2016-0063543, filed on May 24, 2016, the entire contents of each of which are incorporated herein by reference.

TECHNICAL FIELD

The present invention relates to a battery pack.

BACKGROUND

Unlike a primary battery that cannot be charged, a secondary battery may be recharged. A low-capacity secondary battery comprised of one single cell may be used as a power source for various portable small-sized electronic devices, such as cellular phones, and camcorders. A high-capacity secondary battery in which several tens of cells are connected in a battery pack may be used as a power source for motor drives, such as those in hybrid electric vehicles.

The secondary battery is manufactured in various shapes, and representative shapes include a cylindrical shape, a prismatic shape, and a pouch shape. The secondary battery is configured such that an electrode assembly formed by positive and negative electrode plates with a separator as an insulator interposed therebetween, and an electrolyte, are housed in a case, and a cap plate is coupled to the case. A positive electrode terminal and a negative electrode terminal are connected to the electrode assembly and are exposed and protruded to the outside through the cap plate.

SUMMARY

The present invention has been made in an effort to solve the problems of the prior art, and it is an aspect of the present invention to provide a battery pack including heat dissipation members extended from the inside to the outside of a module to easily dissipate the heat generated from the module to the outside, and further including a duct and a cooling fan to maximize or increase cooling efficiency of the module.

In accordance with an aspect of the present invention, the above and other features can be accomplished by providing a battery pack comprising: at least one module including a plurality of unit cells, a plurality of spacers between the unit cells, and a module case accommodating the unit cells and the spacers; a plurality of heat dissipation members inserted into the module and extended from the inside to the outside of the module; a duct including an opening and provided at a side of the module; and a cooling fan connected to the opening of the duct.

Here, each of the heat dissipation members may include a heat dissipation plate including an insertion plate inserted into the module to be located between each of the unit cells and each of the spacers and an extension plate bent from the insertion plate to extend to the outside of the module; and a heat dissipation pad attached to the insertion plate.

The insertion plate may be spaced apart from the unit cell and may be in direct contact with the spacer.

The heat dissipation pad may be located between the unit cell and the insertion plate.

The spacer may include a plurality of heat dissipation holes formed along boundaries between the unit cells.

The module case may include a pair of side plates covering a pair of unit cell surfaces facing each other, and the side plates may include a plurality of heat dissipation holes corresponding to the plurality of heat dissipation holes of the spacer.

The heat dissipation members may be inserted into the module through the spacers and the heat dissipation holes of the side plates.

The duct may be positioned adjacent to one of the pair of side plates.

The heat dissipation members may be inserted into the module through the heat dissipation holes of the side plate positioned opposite to the duct.

The duct may include a plurality of dissipation holes corresponding to the dissipation holes of the side plate.

The heat dissipation members may be inserted into the module through the heat dissipation holes of the side plate positioned adjacent to the duct.

A heat dissipation hole wholly corresponding to the plurality of heat dissipation members may be formed on one surface of the duct adjacent to the side plate.

The cooling fan may be of a blow type or a suction type.

As described above, a battery pack according to the present invention can maximize or increase cooling efficiency of a module by concurrently or simultaneously performing conduction-type heat dissipation by heat dissipation members extended from the inside to the outside of the module and convection-type heat dissipation by a duct and a cooling fan.

BRIEF DESCRIPTION OF THE DRAWINGS

The patent or application file contains at least one drawing executed in color. Copies of this patent or patent application publication with color drawing(s) will be provided by the Office upon request and payment of the necessary fee. For a better understanding of the present invention, some exemplary embodiments thereof will be described, by way of non-limiting examples and with reference to the attached drawings, wherein.

DESCRIPTION OF REFERENCE DESIGNATORS

Figure 1:
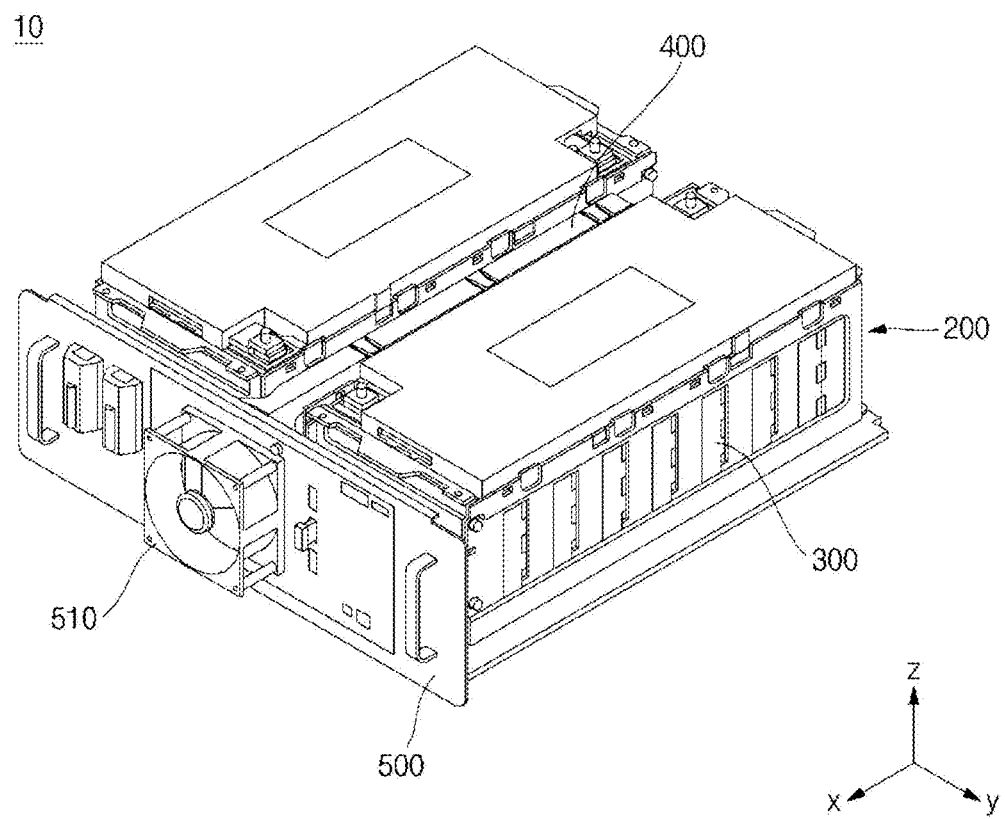
FIG. 1 is a perspective view of a battery pack according to an embodiment of the present invention.

| 10:   | Battery pack            | 100:  | Unit cell               |
|-------|-------------------------|-------|-------------------------|
| 200:  | Module                  | 210:  | Spacer                  |
| 210a: | Heat dissipation hole   | 220:  | Module case             |
| 221:  | Side plate              | 221a: | Heat dissipation hole   |
| 230:  | End plate               | 300:  | Heat dissipation member |
| 310:  | Heat dissipation plate  | 311:  | Insertion plate         |
| 312:  | Extension plate         | 320:  | Heat dissipation pad    |
| 400:  | Duct                    | 410:  | Opening                 |
| 420:  | Path                    | 430:  | Heat dissipation hole   |
| 500:  | Coupling member         | 510:  | Cooling fan             |
| 600:  | Heat dissipation member | 700:  | Duct                    |
| 710:  | Opening                 | 720:  | Path                    |
| 730:  | Heat dissipation hole   |       |                         |

DETAILED DESCRIPTION

Hereinafter, some exemplary embodiments of the present invention will be described in further detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In addition, in the accompanying drawings, sizes or thicknesses of various components may be exaggerated for brevity and clarity. Like numbers refer to like elements throughout. In addition, as used herein, the term "and/or" includes any and all combinations of one or more of the associated listed items.

The terminology used herein is for the purpose of describing particular embodiments and is not intended to be limiting of the disclosure. As used herein, the singular forms are intended to include the plural forms as well, unless the context clearly indicates otherwise. It will be further understood that the terms "comprise" or "include" and/or "comprising" or "including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms "first," "second," etc. may be used herein to describe various members, elements, regions, layers and/or sections, these members, elements, regions, layers and/or sections should not be limited by these terms. These terms are used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Hereinafter, a battery pack according to an embodiment of the present invention will be described with reference to FIGS. 1 to 10.

Figure 2:
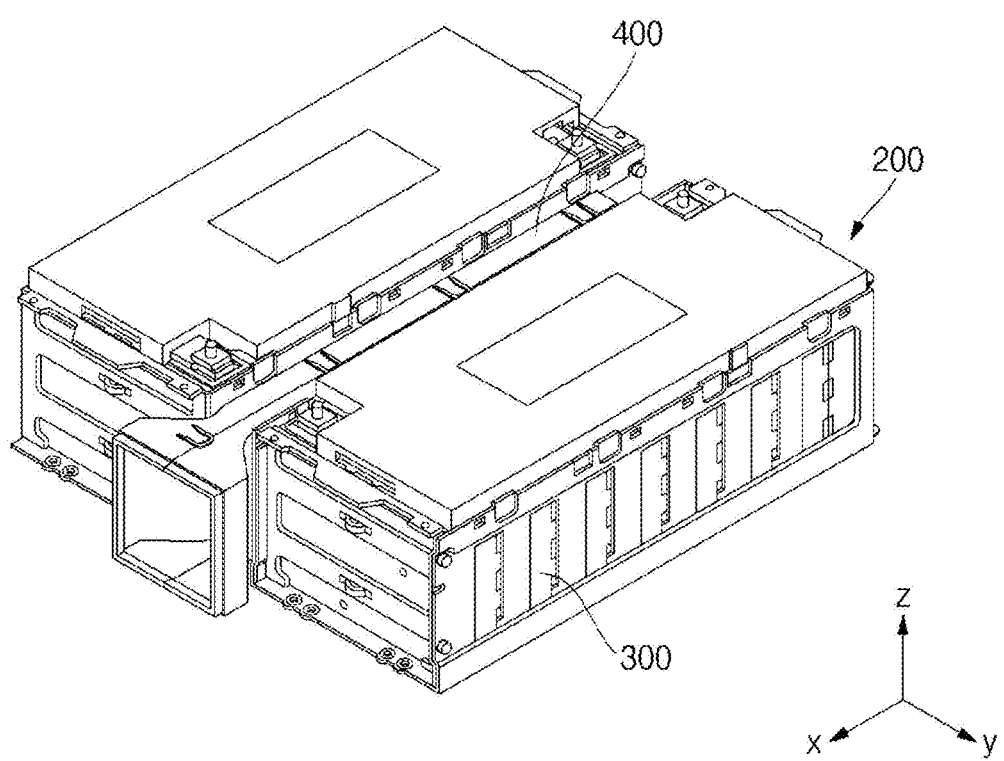
FIG. 2 is a perspective view illustrating a coupling between a module and a duct in a battery pack according to an embodiment of the present invention.
Figure 3:
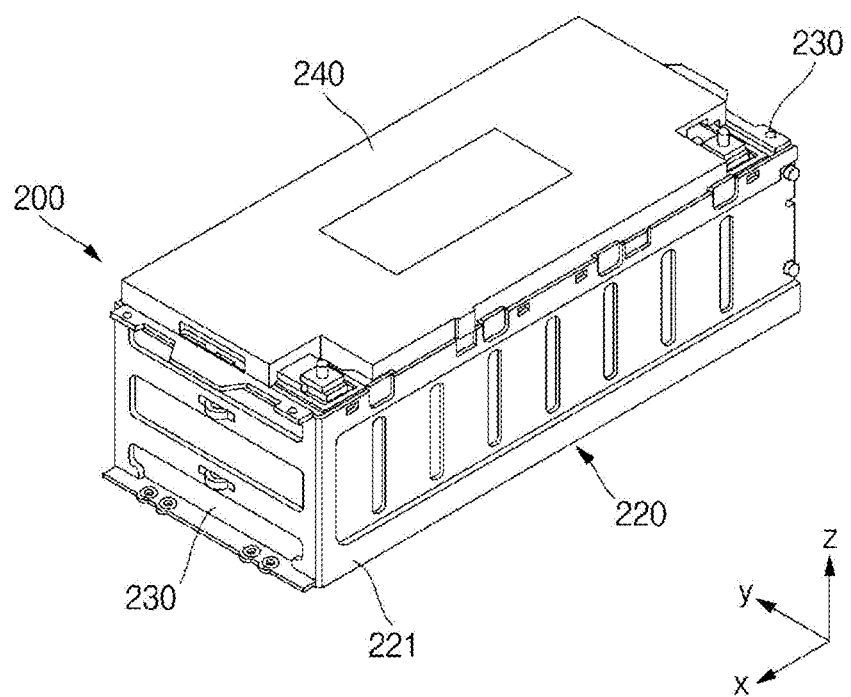
FIG. 3 is a perspective view of a module in a battery pack according to an embodiment of the present invention.
Figure 4:
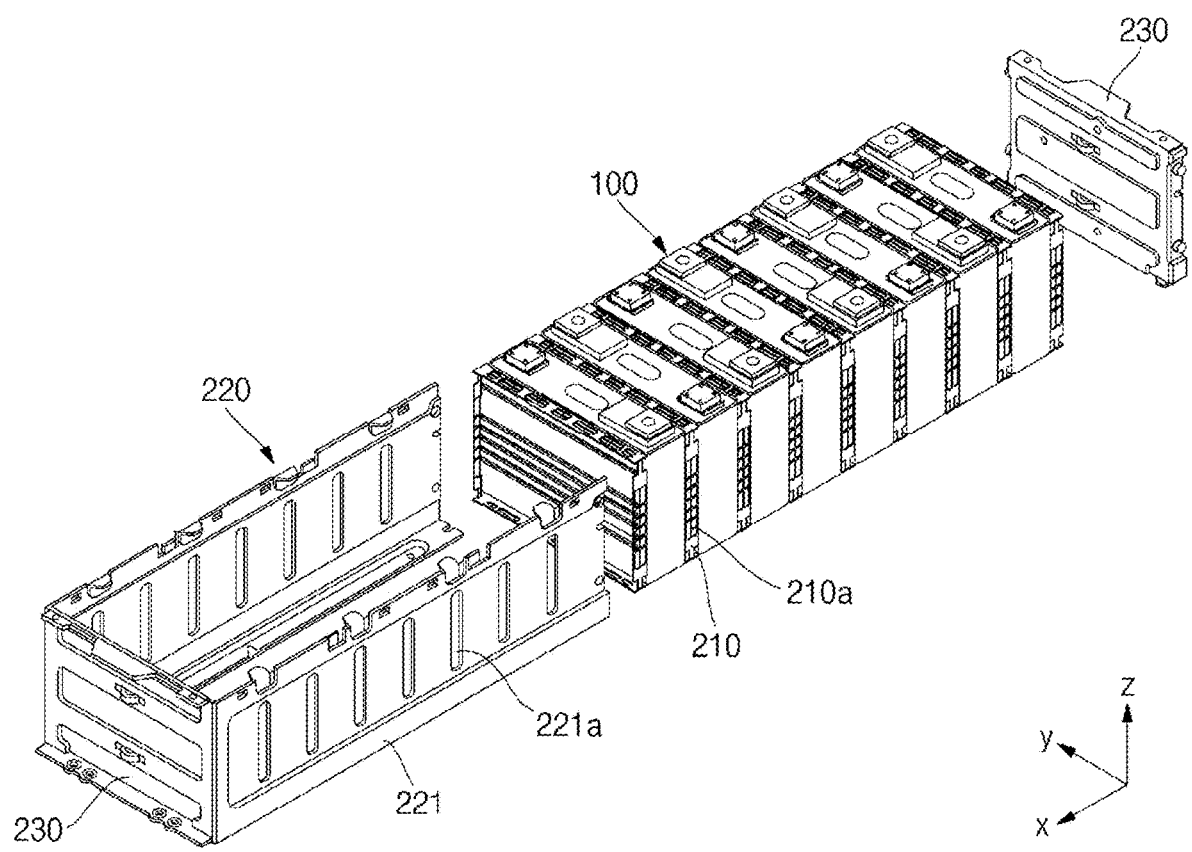
FIG. 4 is an exploded perspective view of a module in a battery pack according to an embodiment of the present invention.
Figure 5:
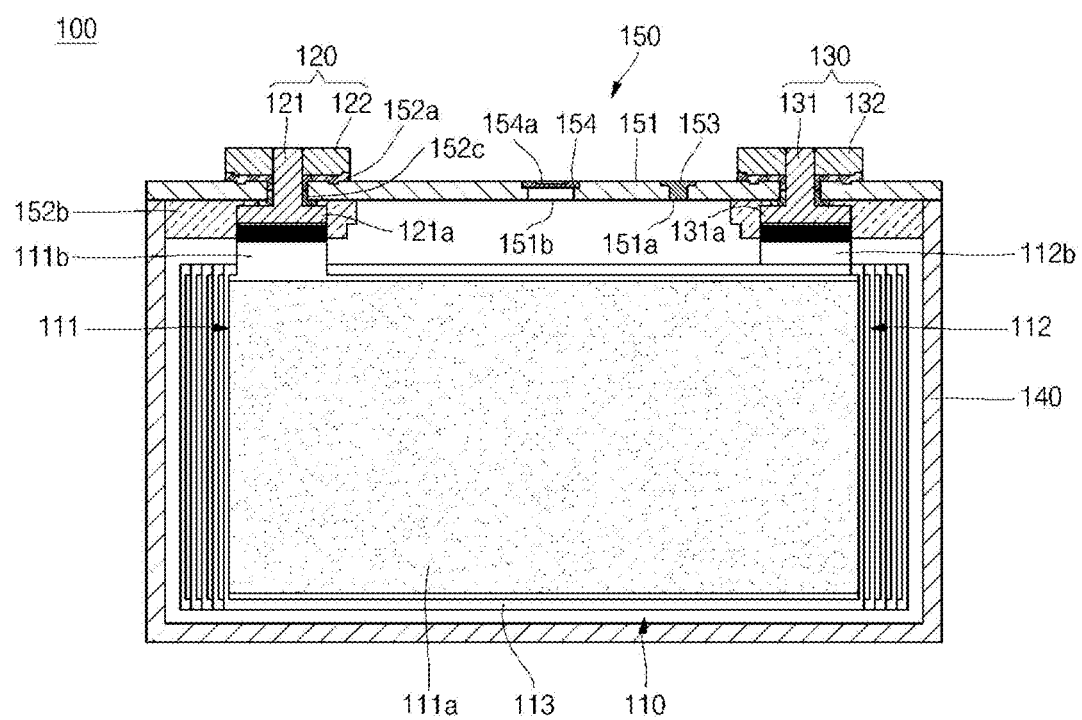
FIG. 5 is a cross-sectional view of a unit cell in a battery pack according to an embodiment of the present invention.
Figure 6:
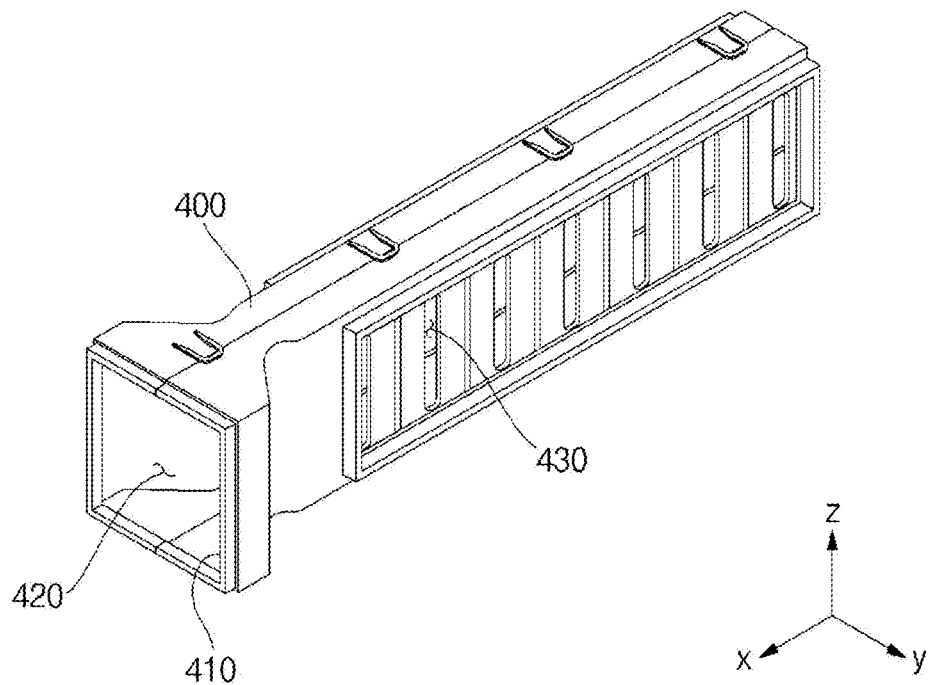
FIG. 6 is a perspective view of a duct in a battery pack according to an embodiment of the present invention.

FIG. 1 is a perspective view of a battery pack according to an embodiment of the present invention. FIG. 2 is a perspective view illustrating a coupling between a module and a duct in a battery pack according to an embodiment of the present invention. FIG. 3 is a perspective view of a module in a battery pack according to an embodiment of the present invention. FIG. 4 is an exploded perspective view of a module in a battery pack according to an embodiment of the present invention. FIG. 5 is a cross-sectional view of a unit cell in a battery pack according to an embodiment of the present invention. FIG. 6 is a perspective view of a duct in a battery pack according to an embodiment of the present invention.

Referring to FIGS. 1 to 6, a battery pack 10 according to an embodiment of the present invention includes a module 200, a heat dissipation member 300, a duct 400, and a coupling member 500. Here, the module 200 may be comprised of two modules, as illustrated, but aspects of the present invention are not limited thereto.

The module 200 includes a plurality of unit cells 100, spacers 210 interposed between each of the unit cells 100, a module case 220 accommodating the unit cells 100 and the spacers 210, and an end plate 230 coupled to an end of the module case 220.

Each of the unit cells 100 includes an electrode assembly 110, a first terminal 120, a second terminal 130, a case 140, and a cap assembly 150.

The electrode assembly 110 is formed by stacking or winding a stacked structure including a first electrode plate 111, a separator 113, and a second electrode plate 112, which are thin plates or layers. Here, the first electrode plate 111 may be a negative electrode and the second electrode plate 112 may be a positive electrode, or vice versa.

The first electrode plate 111 is formed by coating a first electrode active material, such as graphite or carbon, on a first electrode current collector formed of a metal foil made of copper, a copper alloy, nickel, or a nickel alloy. The first electrode plate 111 includes a first electrode active material layer 111a where the first electrode active material is coated, and a first electrode uncoated portion where the first electrode active material is not coated. The first electrode uncoated portion may be a path of current flow between the first electrode plate 111 and the outside. However, the present embodiments do not limit the material of the first electrode plate 111 to those listed herein.

The second electrode plate 112 is formed by coating a second electrode active material, such as a transition metal oxide, on a second electrode current collector formed of a metal foil made of aluminum or an aluminum alloy. The second electrode plate 112 includes a second electrode active material layer (not shown) where the second electrode active material is coated, and a second electrode uncoated portion where the second electrode active material is not coated. The second electrode uncoated portion may be a path of current flow between the second electrode plate 112 and the outside. However, the present embodiments do not limit the material of the second electrode plate 112 to those listed herein.

The first electrode plate 111 and the second electrode plate 112 may have opposite polarities.

The separator 113 may be positioned between the first electrode plate 111 and the second electrode plate 112 to prevent a short circuit and may allow movement of lithium ions. The separator 113 may be formed of polyethylene, polypropylene, or a composite film of polyethylene and polypropylene. However, the present embodiments do not limit the material of the separator 113 to those listed therein.

The electrode assembly 110 is accommodated in the case 140 with an electrolyte solution. The electrolyte solution may be a mixture including a lithium salt dissolved in an organic solvent. The electrolyte solution may be in a liquid phase, a solid phase, or a gel phase.

A first electrode tab 111b and a second electrode tab 112b may be connected to at least one portion of the first electrode plate 111 and the second electrode plate 112, respectively. In more detail, the first electrode tab 111b is interposed between the electrode assembly 110 and the first terminal 120, and the second electrode tab 112b is interposed between the electrode assembly 110 and the second terminal 130. The first electrode tab 111b and the second electrode tab 112b may also be collectively referred to as electrode tabs 111b and 112b herein.

The first electrode tab 111b may be configured to have a structure in which the first electrode uncoated portion of the first electrode plate 111 of the electrode assembly 110, where the first electrode active material is not coated, is protruded itself. In this case, the first electrode tab 111b may be formed by stacking the first electrode uncoated portion in the wound or stacked electrode assembly 110 without a separate member. However, the first electrode tab 111b may also be formed using a separate member connected to the first electrode uncoated portion. Like the first electrode tab 111b, the second electrode tab 112b may also be configured to have a structure in which the second electrode uncoated portion of the second electrode plate 112 of the electrode assembly 110, where the second electrode active material is not coated, is protruded itself, or may be formed with a separate member connected to the second electrode uncoated portion.

The first electrode tab 111b is extended from a top end of the electrode assembly 110 to a bottom end of the first terminal 120, which will later be described, and the second electrode tab 112b is extended from a top end of the electrode assembly 110 to a bottom end of the second terminal 130, which will later be described. The first electrode tab 111b and the second electrode tab 112b are directly electrically connected or welded to the first terminal 120 and the second terminal 130, respectively.

In case of a high-capacity, high-output battery, the plurality of electrode tabs 111b and 112b are extended from the electrode assembly 110, thereby obtaining a high output current. In addition, since the electrode tabs 111b, 112b, uncoated portions or separate members of the electrode assembly 110 are directly electrically connected to the terminals, electric paths can be shortened, thereby simplifying electrically connecting processes between the electrode assembly 110 and the terminals, lowering internal resistance of the secondary battery and reducing the number of components of the secondary battery. Additionally, since a winding axis of the electrode assembly 110 is substantially parallel with terminal axes of the first and second terminals 120 and 130, the electrode assembly 110 may have excellent capability of impregnating an electrolyte solution in injecting the electrolyte solution, and internal gases of the electrode assembly 110 may rapidly move to a safety vent during overcharging, thereby allowing the safety vent to operate quickly.

The first terminal 120 is electrically connected to the first electrode plate 111 and includes a first terminal pillar 121 and a first terminal plate 122.

The first terminal pillar 121 is upwardly protruded and extended a length (e.g., a predetermined length) while extending through the cap plate 151, which will later be described. The first terminal pillar 121 is electrically connected to the first electrode tab 111b from below the cap plate 151. In addition, the first terminal pillar 121 includes a flange 121a formed to prevent the first terminal pillar 121 from being dislodged from the cap plate 151 from below the cap plate 151. In particular, the first electrode tab 111b is electrically connected or welded to the flange 121a. Meanwhile, the first terminal pillar 121 is electrically insulated from the cap plate 151.

The first terminal plate 122 includes a hole (not shown) formed at its center. The first terminal pillar 121 is coupled and welded to the hole. That is, boundary regions of the first terminal pillar 121 and the first terminal plate 122, which are upwardly exposed, are welded to each other. For example, laser beams are applied to the boundary regions of the first terminal pillar 121 and the first terminal plate 122 to allow the boundary regions to be fused to each other, followed by cooling, thereby achieving welding of the first terminal pillar 121 and the first terminal plate 122.

The second terminal 130 is electrically connected to the second electrode plate 112 and includes a second terminal pillar 131 and a second terminal plate 132.

The second terminal pillar 131 is upwardly protruded and extended a length (e.g., a predetermined length) while extending through the cap plate 151, which will later be described. The second terminal pillar 131 is electrically connected to the second electrode tab 112b from below the cap plate 151. In addition, the second terminal pillar 131 includes a flange 131a formed to prevent the second terminal pillar 131 from being dislodged from the cap plate 151 from below the cap plate 151. In particular, the second electrode tab 112b is electrically connected or welded to the flange 131a. Meanwhile, the second terminal pillar 131 is electrically insulated from the cap plate 151. Alternatively, the second terminal pillar 131 may be electrically connected to the cap plate 151.

The second terminal plate 132 includes a hole (not shown). The second terminal pillar 131 is coupled and welded to the hole. That is, boundary regions of the second terminal pillar 131 and the second terminal plate 132, which are upwardly exposed, are welded to each other. For example, laser beams are applied to the boundary regions of the second terminal pillar 131 and the second terminal plate 132 to allow the boundary regions to be fused to each other, followed by cooling, thereby achieving welding of the second terminal pillar 131 and the second terminal plate 132.

The case 140 is made of a conductive metal, such as aluminum, an aluminum alloy, or nickel plated steel. In addition, the case 140 may be formed in a substantially hexahedral shape and may have a top opening through which the electrode assembly 110, the first terminal 120, and the second terminal 130 are inserted and placed. That is, the case 140 includes two pairs of side portions spaced a distance (e.g., a predetermined distance) apart from each other and facing each other and a bottom portion formed at a lower side to be perpendicular to the two pairs of side portions. The interior surface of the case 140 may be insulated, such that the case 140 is insulated from the electrode assembly 110, the first terminal 120, the second terminal 130, and the cap assembly 150.

The cap assembly 150 is coupled to the case 140. That is, the cap assembly 150 closes the opening of the case 140. In an embodiment, the cap assembly 150 includes the cap plate 151, a gasket 152c, a plug 153, a safety vent 154, an upper insulation member 152a, and a lower insulation member 152b.

The cap plate 151 may seal the opening of the case 140 and may be made of the same material as the case 140. For example, the cap plate 151 may be coupled to the case 140 by laser welding. Here, the cap plate 151 and the second terminal 130 may have the same polarity, as described above. Accordingly, the cap plate 151 and the case 140 may also have the same polarity.

The plug 153 may seal an electrolyte solution injection hole 151a of the cap plate 151. In addition, the safety vent 154 is formed to correspond to a vent hole 151b of the cap plate 151. The safety vent 154 is formed to have a smaller thickness than other regions of the cap plate 151 and is formed by covering the vent hole 151b of the cap plate 151. In addition, the safety vent 154 may prevent the battery from being exploded by being opened earlier than other regions of the cap plate 151 at a preset pressure. Here, the safety vent 154 may have a notch 154a formed on a surface thereof to be easily opened at the preset pressure. In addition, even if the vent hole 151b is not separately formed in the cap plate 151, the cap plate 151 may be processed to have a smaller thickness than other regions of the cap plate 151 to then be incorporated into the safety vent 154.

The gasket 152c is formed between each of the first terminal pillar 121 and the second terminal pillar 131 and the cap plate 151 using an insulating material and seals portions between each of the first terminal pillar 121 and the second terminal pillar 131 and the cap plate 151. The gasket 152c may prevent external moisture from penetrating into the unit cell 100 or may prevent an electrolyte contained in the unit cell 100 from flowing out.

The upper insulation member 152a is formed between each of the first terminal pillar 121 and the second terminal pillar 131 and the cap plate 151. In addition, the upper insulation member 152a makes close contact with the cap plate 151. In addition, the upper insulation member 152a makes close contact with the gasket 152c as well. The upper insulation member 152a electrically insulates each of the first terminal pillar 121 and the second terminal pillar 131 and the cap plate 151 from each other.

The lower insulation member 152b is formed between each of the first electrode tab 111b and the second electrode tab 112b and the cap plate 151 to prevent unnecessary electric shorts from occurring between each of the first electrode tab 111b and the second electrode tab 112b and the cap plate 151. That is, the lower insulation member 152b may prevent electric shorts between the first electrode tab 111b and the cap plate 151 and between the second electrode tab 112b and the cap plate 151.

In an embodiment in which the cap plate 151 and the second terminal 130 have the same polarity, the gasket 152c, the upper insulation member 152a, and the lower insulation member 152b between the second terminal 130 and the cap plate 151 may not be provided according to the structure.

The unit cell 100 includes a plurality of unit cells arrayed in a line, as shown in FIG. 4. Here, the first terminal 120 or the second terminal 130 of the unit cell 100 may be connected to the first terminal 120 or the second terminal 130 of a neighboring unit cell 100 in series or parallel. In addition, although not shown, the connecting of the first and second terminals 120 and 130 may be achieved through a bus bar.

The spacers 210 are interposed between each of the unit cells 100. Each of the spacers 210 electrically insulates neighboring unit cells 100 from each other. That is, the case 140 of the unit cells 100 may be formed to have a polarity, and the spacers 210 may be formed using an insulating material, thereby preventing or reducing electrical interference between the neighboring unit cells 100.

In addition, the spacer 210 may also be disposed on the outer surface of the outermost unit cell 100. That is, the spacer 210 may also be disposed between the end plate 230 to be described later and the unit cell 100. Therefore, the unit cell 100 and the end plate 230 may be electrically insulated from each other by the spacer 210.

In addition, the spacer 210 may suppress swelling of the unit cell 100. That is, the case 140 of the unit cells 100 may be made of a deformable metal, such that the case 140 can undergo thermal expansion during use. Here, the spacer 210 may be formed using a scarcely deformable material, such as a polymer, thereby preventing or reducing the unit cell 100 from being swollen.

The spacer 210 includes a plurality of heat dissipation holes 210a formed along boundary regions between the unit cells 100. That is, the heat dissipation holes 210a may include a plurality heat dissipation holes provided on four side portions formed along outer peripheries of the spacer 210 for a contact surface between the unit cells 100. In addition, the heat dissipation holes 210a may include a plurality of heat dissipation holes formed on each of the side portions of the spacer 210. That is, the heat dissipation holes 210a may include a plurality of heat dissipation holes to be spaced apart from each other on each of the side portions of the spacer 210.

The heat generated from the unit cells 100 is dissipated to the outside of the module 200 through the heat dissipation holes 210a. In addition, the heat dissipation holes 210a may function as paths through which the heat dissipation member 300 is inserted, which will later be described in more detail.

The module case 220 accommodates the plurality of unit cells 100 and the spacers 210. The module case 220 may include a pair of side plates 221 facing each other.

The side plate 221 is formed to have a plate shape to cover side portions of the plurality of unit cells 100. In further detail, the side plate 221 is positioned to cover narrow short-side portions of the case 140 of the unit cells 100. In addition, the end plate 230 to be described later is coupled to opposite ends of the side plate 221 and covers outer surfaces of the outermost unit cells 100 or the spacers 210 positioned at opposite sides. That is, the module case 220 is formed to cover side portions of an array of the plurality of unit cells 100 through the side plate 221. Here, at least one of the end plates 230 positioned at opposite sides may be incorporated into the side plate 221.

A plurality of heat dissipation holes 221a may be formed in the side plate 221. The heat dissipation holes 221a may be formed at positions corresponding to the spacers 210. Here, one of the heat dissipation holes 221a of the side plate 221 corresponds to the plurality of heat dissipation holes 210a positioned on sides of the spacers 210. Therefore, the heat emitted from the plurality of unit cells 100 may be dissipated to the outside through the heat dissipation holes 210a of the spacers 210 and the heat dissipation holes 221a of the side plate 221. In addition, the heat dissipation holes 221a may also function as paths through which the heat dissipation member 300 to be described later is inserted.

The plate-shaped end plates 230 are coupled to open ends of the module case 220. The end plates 230 are provided in a pair to cover outer surfaces of the unit cells 100 or the spacers 210 positioned at the outermost portions of the respective ends. The end plates 230 may be coupled to the module case 220 by a mechanical coupling method, such as bolt coupling or hook coupling.

As described above, the plurality of unit cells 100 and the spacers 210 are mounted in the module case 220 through the open ends of the module case 220. Thereafter, the end plates 230 are assembled to the opposite open ends. Then, a cover 240 is coupled to top portions of the plurality of unit cells 100, thereby forming the module 200.

The heat dissipation member 300 is inserted between the spacer 210 and the unit cell 100 through the heat dissipation holes 221a of the side plate 221 and the heat dissipation holes 210a of the spacer 210. In addition, one end of the heat dissipation member 300 is extended to sides of the module 200 to then be exposed to the outside of the module 200. The heat dissipation member 300 will later be described in more detail.

The duct 400 is formed to be adjacent to the side plate 221 of the module 200. In the present invention, the duct 400 is disposed between the two modules 200. In more detail, the duct 400 is disposed such that its opposite sides face the side plates 221 of the modules 200. The duct 400 includes an opening 410 formed at one end to be opened, and the other end of the duct 400, which faces the opening 410, is closed. In addition, the duct 400 includes a path 420 formed therein to allow the air to be induced or discharged.

A plurality of heat dissipation holes 430 are formed on the opposite sides of the duct 400, i.e., surfaces of the duct 400 facing the modules 200. Here, the heat dissipation holes 430 are formed at positions corresponding to the heat dissipation holes 221a of the side plate 221. Therefore, the heat generated from the modules 200 may be dissipated through the opening 410 via the heat dissipation holes 210a of the spacer 210, the heat dissipation holes 221a of the side plate 221, and the heat dissipation holes 430 and the path 420 of the duct 400. Alternatively, the air induced through the opening 410 may be induced into the modules 200 via the path 420 and the heat dissipation holes 430, 221a and 210a, thereby cooling the unit cells 100.

The coupling member 500 is coupled to regions corresponding to the end plate 230 of the module 200. That is, the coupling member 500 may be coupled to a position corresponding to the opening 410 of the duct 400. In addition, a cooling fan 510 is formed at a region of the coupling member 500 corresponding to the opening 410. Therefore, the air may be induced to or discharged from the duct 400 according to the operation of the cooling fan 510. In more detail, the cooling fan 510 may be of a blow type or a suction type.

In a case in which the cooling fan 510 is of a blow type, external air is induced to the path 420 of the duct 400 by the operation of the cooling fan 510. In addition, the air is induced into the module 200 through the heat dissipation holes 430 of the duct 400, thereby cooling the unit cells 100. In addition, the air containing absorbed heat is released to the outside through the heat dissipation holes 221a of the module 200 positioned opposite to the duct 400, thereby performing heat dissipation of the module 200.

Conversely, in a case in which the cooling fan 510 is of a suction type, the hot air contained in the module 200 is absorbed into the path 420 of the duct 400 by the operation of the cooling fan 510. Here, the hot air may be produced in such a manner that the external air induced into the module 200 through the heat dissipation holes 221a of the module 200 positioned opposite to the duct 400 absorbs the heat from the module 200. That is, the duct 400 absorbs the air from the module 200 through the heat dissipation holes 430, thereby cooling the unit cells 100. The air is released to the outside through the opening 410 of the duct 400, thereby performing heat dissipation of the module 200.

Although not specifically illustrated, an external terminal for connecting the battery pack 10 to an external device or a protection circuit module for controlling charging/discharging of the battery pack 10 may be formed in the coupling member 500.

Figure 7:
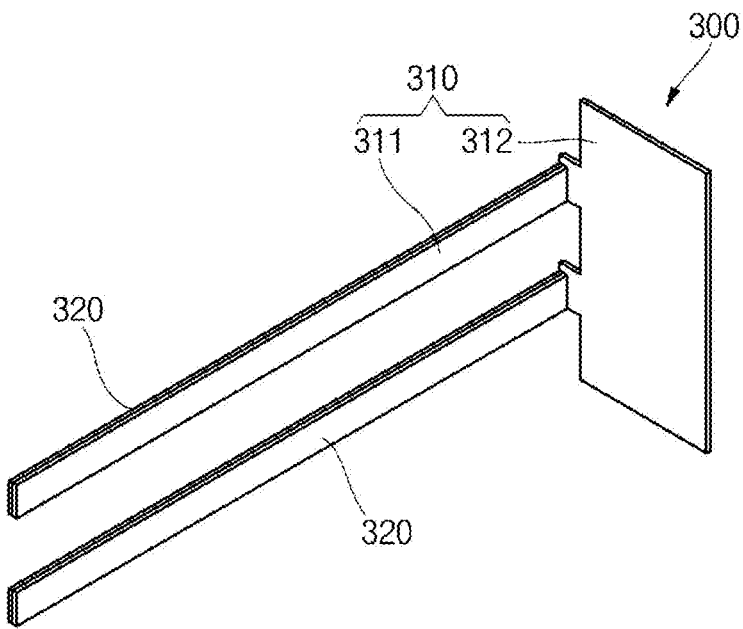
FIG. 7 is an exploded perspective view of a heat dissipation member in a battery pack according to an embodiment of the present invention.
Figure 8:
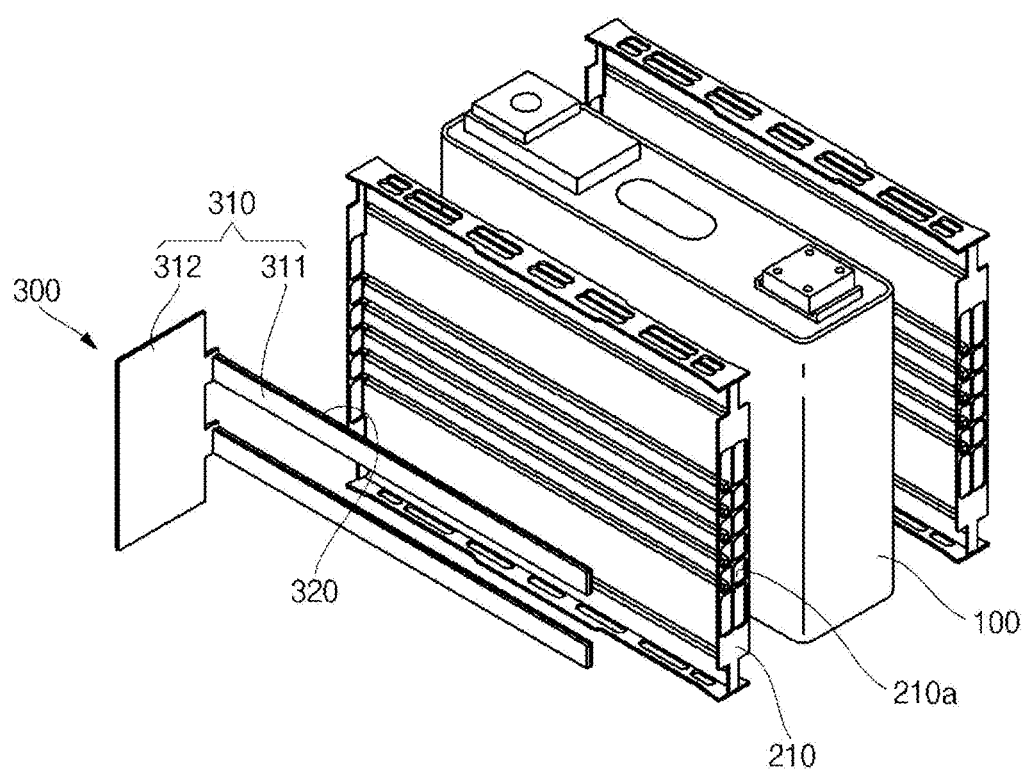
FIG. 8 is a perspective view illustrating couplings among unit cells, spacers, and heat dissipation members in a battery pack according to an embodiment of the present invention.
Figure 9:
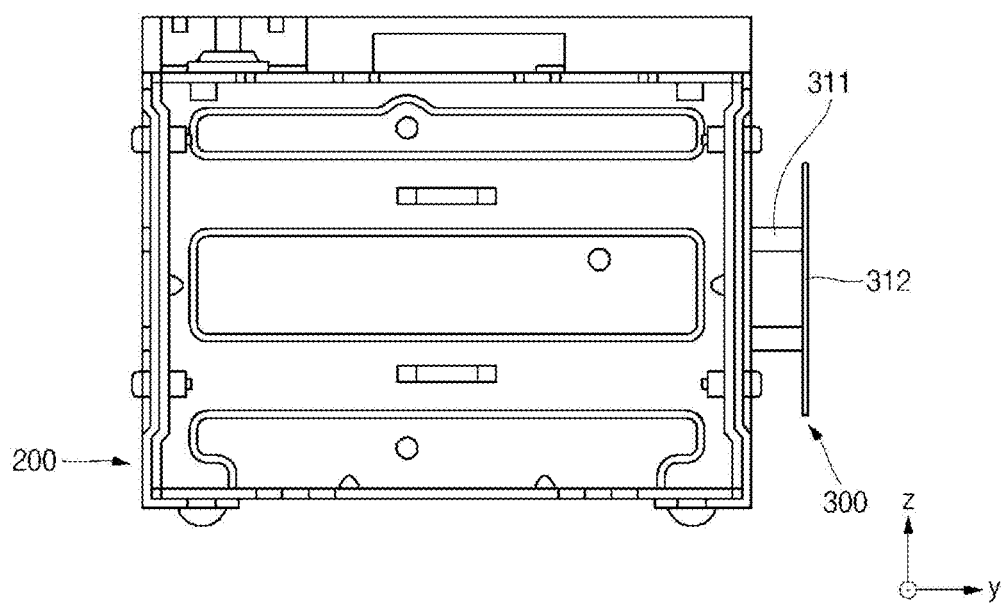
FIG. 9 is a front view illustrating a coupling between a module and a heat dissipation member in a battery pack according to an embodiment of the present invention.
Figure 10:
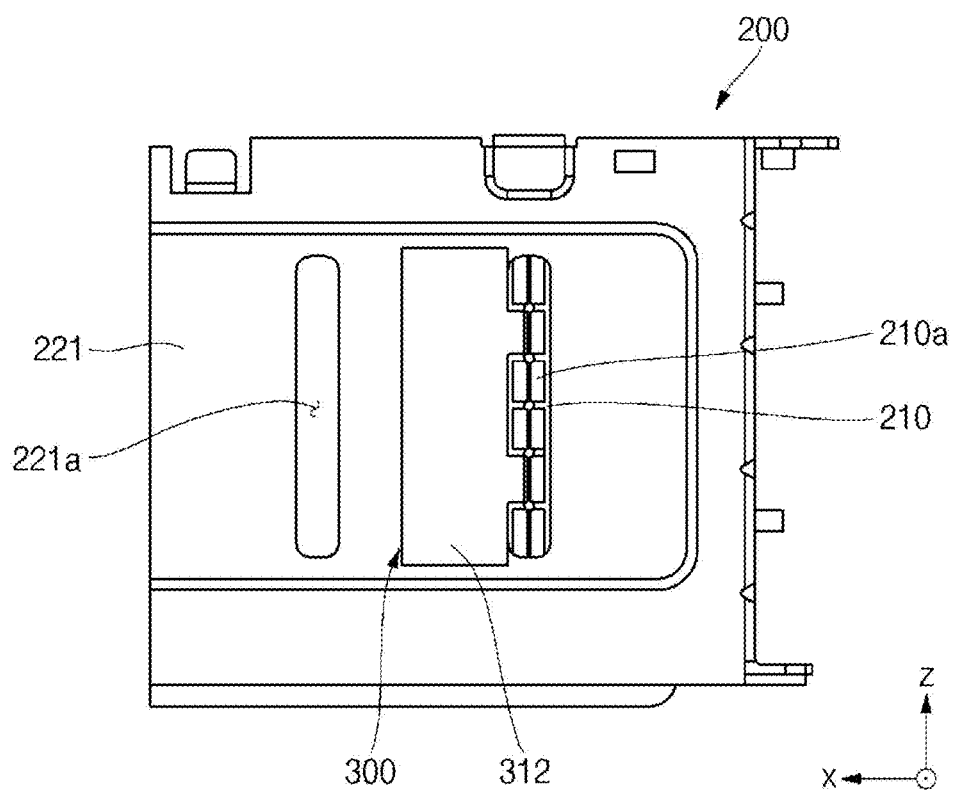
FIG. 10 is a side view illustrating a coupling region of a module and a heat dissipation member in a battery pack according to an embodiment of the present invention.

FIG. 7 is an exploded perspective view of a heat dissipation member in a battery pack according to an embodiment of the present invention. FIG. 8 is a perspective view illustrating couplings among unit cells, spacers, and heat dissipation members in a battery pack according to an embodiment of the present invention. FIG. 9 is a front view illustrating a coupling between a module and a heat dissipation member in a battery pack according to an embodiment of the present invention. FIG. 10 is a side view illustrating a coupling region of a module and a heat dissipation member in a battery pack according to an embodiment of the present invention.

Next, heat dissipation members according to an embodiment of the present invention and a coupling mechanism thereof will be described in more detail with reference to FIGS. 7 to 10.

First, the heat dissipation member 300 may include a heat dissipation plate 310 and a heat dissipation pad 320.

The heat dissipation plate 310 is extended from the inside to the outside of the module 200 to function to absorb the heat generated from the unit cells 100 to then transfer and dissipate the absorbed heat to the outside. The heat dissipation plate 310 is preferably made of a material having good thermal conductivity, such as aluminum or copper. The heat dissipation plate 310 includes an insertion plate 311 inserted into the module 200 and an extension plate 312 extended from the insertion plate 311 to the outside of the module 200. That is, the heat from the module 200 is absorbed through the insertion plate 311 and the absorbed heat is transferred and dissipated to the extension plate 312 positioned at the outside of the module 200, thereby cooling the module 200.

The insertion plate 311 is inserted into the module 200 to be interposed between the unit cell 100 and the spacer 210. In more detail, the insertion plate 311 is inserted into the module 200 through the heat dissipation holes 221a of the side plate 221 and the heat dissipation holes 210a of the spacer 210. Here, the insertion plate 311 is inserted through the side plate 221 positioned opposite to the duct 400.

The insertion plate 311 is formed to extend along relatively wide long-side portions of two pairs of side portions of the unit cell 100. In an embodiment, the insertion plate 311 may include a pair of insertion plates spaced apart from each other. That is, a pair of insertion plates 311 may be provided such that one of the two insertion plates 311 is disposed on an upper side of the relatively wide long-side portion and the other is disposed on a lower side of the relatively wide long-side portion. Accordingly, the heat generated from the unit cells 100 may be evenly absorbed and transferred through the insertion plates 311 to then be dissipated to the outside. However, the insertion plates 311 are not limited to the structure disclosed herein, but a variety of structures can be adopted by the insertion plates 311.

The insertion plate 311 is inserted into one of the heat dissipation holes 210a positioned on the side portion of the spacer 210. In the present embodiment, two insertion plates 311 are formed in a pair to be inserted into the spaced-apart heat dissipation holes 210a, such as one after the other.

Therefore, the heat dissipation member 300 can be mounted in the module 200 to be coupled thereto without a separate fixing member.

In order to maintain the insertion plate 311 at an electrically neutral state, the insertion plate 311 is positioned to be spaced apart from the unit cell 100. That is, in an embodiment, the heat dissipation plate 310 is made of a metal, such as aluminum or copper, and is positioned so as not to contact the case 140 of the unit cell 100 having a polarity. In further detail, the insertion plate 311 is brought into contact with the unit cell 100 in a state in which the heat dissipation pad 320 to be described later is interposed between the insertion plate 311 and the unit cell 100. Therefore, the insertion plate 311 is inserted into the module 200 through the heat dissipation holes 210a to make direct contact with the spacer 210.

The extension plate 312 is extended from the insertion plate 311 to the outside of the module 200. In more detail, the extension plate 312 is substantially vertically bent from the insertion plate 311 to then be extended along the side portion of the module 200. That is, the extension plate 312 is formed along the side plate 221. Here, one extension plate 312 is formed to have a width not greater than a distance between the heat dissipation holes 221a of the side plate 221 so as to avoid interference with the extension plate 312 of the adjacent heat dissipation plate 310.

The extension plate 312 is extended from the insertion plate 311 of the module 200 to be positioned at the outside of the module 200, thereby easily transferring the heat absorbed by the insertion plate 311 to the outside of the module 200. In addition, the extension plate 312 is naturally cooled by the external air from the outside of the module 200, thereby performing heat dissipation of the module 200.

The heat dissipation pad 320 is formed to have the same configuration with the insertion plate 311 of the heat dissipation plate 310. In addition, the heat dissipation pad 320 is attached to the extension plate 312 to make direct contact with the unit cells 100. That is, the heat dissipation pad 320 is disposed between the unit cell 100 and the insertion plate 311 to insulate the unit cell 100 and the insertion plate 311 from each other. In addition, the heat dissipation pad 320 may function to increase adhesion between the heat dissipation plate 310 and the unit cell 100. In addition, the heat dissipation pad 320 functions to easily transfer the heat of the unit cell 100 to the insertion plate 311. Therefore, the heat generated from the modules 200 is transferred to the insertion plate 311 and the extension plate 312 to the outside through the heat dissipation pad 320. In an embodiment, the heat dissipation pad 320 is made of silicon or acryl, but aspects of the present invention are not limited thereto.

Meanwhile, in order to show an arrangement of the unit cell 100, the spacers 210, and the heat dissipation plate 310, the heat dissipation plate 310 is shown positioned outside the spacer 210, as illustrated in FIG. 8. In practice, however, the heat dissipation plate 310 is inserted into the heat dissipation holes 221a of the spacer 210.

Additionally, even if the heat dissipation member 300 is inserted into the module 200 through the heat dissipation holes 221a and 210a, air passageways with respect to the outside, formed by the heat dissipation holes 221a and 210a, may also exist, as shown in FIG. 10. Therefore, conduction-type heat dissipation by means of the heat dissipation member 300 and convection-type heat dissipation by means of the heat dissipation holes 221a and 210a can be concurrently or simultaneously performed.

The heat dissipation member 300 includes a plurality of heat dissipation members to be inserted into portions between each of the unit cells 100. Here, the insertion plate 311 and the heat dissipation pad 320 formed in each of the heat dissipation members 300 may be formed so as not to be positioned at the same positions of all of the heat dissipation members 300. That is, the insertion plate 311 and the heat dissipation pad 320 may be differently positioned in the plurality of heat dissipation members 300. In case of the heat dissipation member 300 positioned at the center of the unit cell 100, for example, the insertion plate 311 and the heat dissipation pad 320 may include relatively large numbers of insertion plates and heat dissipation pads, respectively, to be uniformly arranged along top-and-bottom direction. In addition, in case of the heat dissipation member 300 positioned at an end of the unit cell 100, the insertion plate 311 and the heat dissipation pad 320 may include relatively small numbers of insertion plates and heat dissipation pads, respectively, to be densely arranged substantially at the center along top-and-bottom direction. With this configuration, more efficient heat dissipation can be achieved by controlling the speed and pressure of the air moving through the duct 400.

Next, the heat dissipation operation of the battery pack according to an embodiment of the present invention will be described with reference to FIGS. 1 to 10.

In the battery pack 10 according to an embodiment of the present invention, the duct 400 is interposed between two modules 200. The heat dissipation member 300 is inserted into the side plate 221 in one of the modules 200 positioned opposite to the duct 400. That is, the heat dissipation member 300 is inserted into the heat dissipation holes 210a of the spacer 210 and the heat dissipation holes 221a of the side plate 221 in one of the modules 200 positioned opposite to the duct 400. Here, the heat dissipation member 300 may be positioned between the unit cell 100 and the spacer 210.

The heat dissipation member 300 includes the heat dissipation plate 310 including the insertion plate 311 positioned inside the module 200 and the extension plate 312 positioned outside the module 200, and the heat dissipation pad 320 attached to the insertion plate 311. In practice, the insertion plate 311 is brought into contact with the spacer 210, and the heat dissipation pad 320 is brought into contact with the unit cell 100. Therefore, the heat generated from the unit cell 100 is transferred by conduction to the outside of the module 200 via the heat dissipation pad 320, the insertion plate 311, and the extension plate 312. In addition, the extension plate 312 is cooled by the external air from the outside of the module 200, thereby performing heat dissipation of the module 200.

The cooling fan 510 is installed in the opening 410 of the duct 400. The cooling fan 510 may be of a blow type or a suction type. In case the cooling fan 510 is of a blow type, the air induced into the duct 400 may be cooled by absorbing the heat and then being released to the outside while passing through the module 200. In case the cooling fan 510 is of a suction type, the hot air having absorbed the heat existing within the module 200 may be cooled by being absorbed into the duct 400 and then being dissipated to the outside through the opening 410.

In the battery pack 10 according to the present invention, since the heat dissipation member 300 is positioned outside the module 200 opposite to the duct 400, the blow type cooling fan 510 can maximize or increase heat dissipation efficiency. That is, both a heat transfer path of the heat dissipation member 300 and a blow type air discharge path face the side plate 221 positioned opposite to the duct 400, thereby easily performing heat dissipation of the module 200.

As described above, since the battery pack 10 according to an embodiment of the present invention includes the heat dissipation member 300 extended from the inside to the outside of the module 200, the heat generated from the module 200 can be easily dissipated to the outside. In addition, the battery pack 10 according to an embodiment of the present invention is configured to further include the duct 400 and the cooling fan 510, thereby maximizing or increasing the cooling efficiency of the module 200. That is, in the battery pack 10 according to the present invention, conduction-type heat dissipation by means of the heat dissipation member 300 and convection-type heat dissipation by means of the duct 400 and the cooling fan 510 are concurrently or simultaneously performed, thereby maximizing or increasing heat dissipation performance of the battery pack 10.

Hereinafter, a battery pack according to another embodiment of the present invention will be described with reference to FIGS. 11 and 12.

Figure 11:
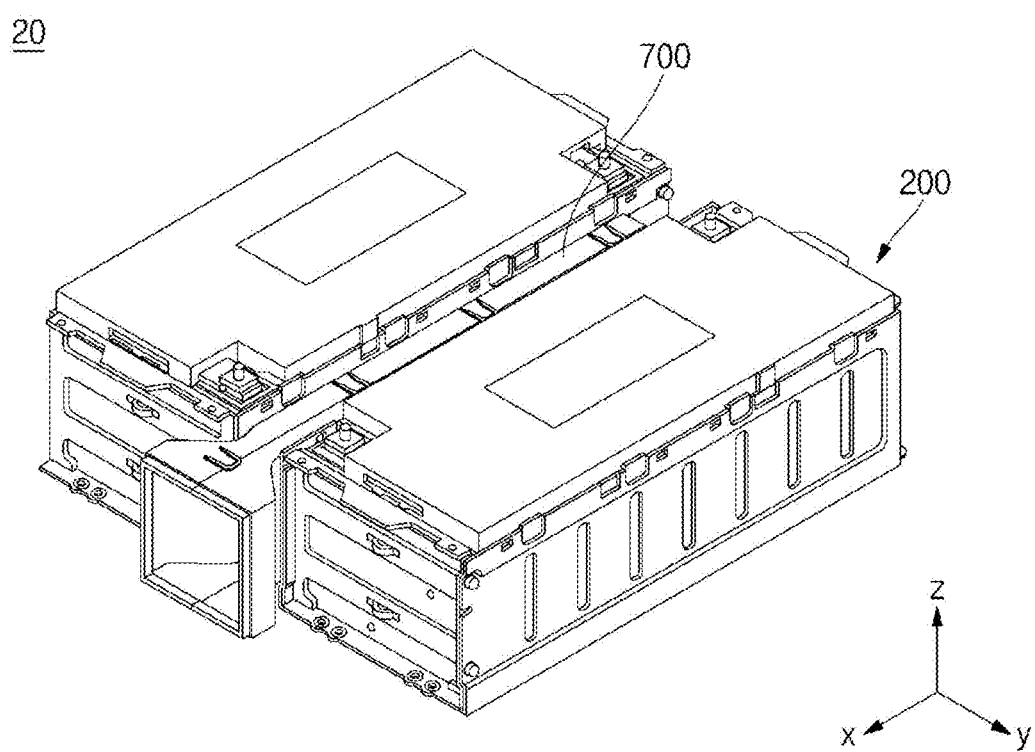
FIG. 11 is a perspective view of a battery pack according to another embodiment of the present invention.

FIG. 11 is a perspective view of a battery pack according to another embodiment of the present invention. FIG. 12 is a perspective view of a battery pack with a module not shown in the battery pack illustrated in FIG. 11. Since the battery pack 20 according to another embodiment of the present invention is substantially the same with the battery pack 10 according to the previous embodiment of the present invention, except for installation positions of heat dissipation members 600 and a structure of a duct 700, the following description will focus on these components.

Figure 12:
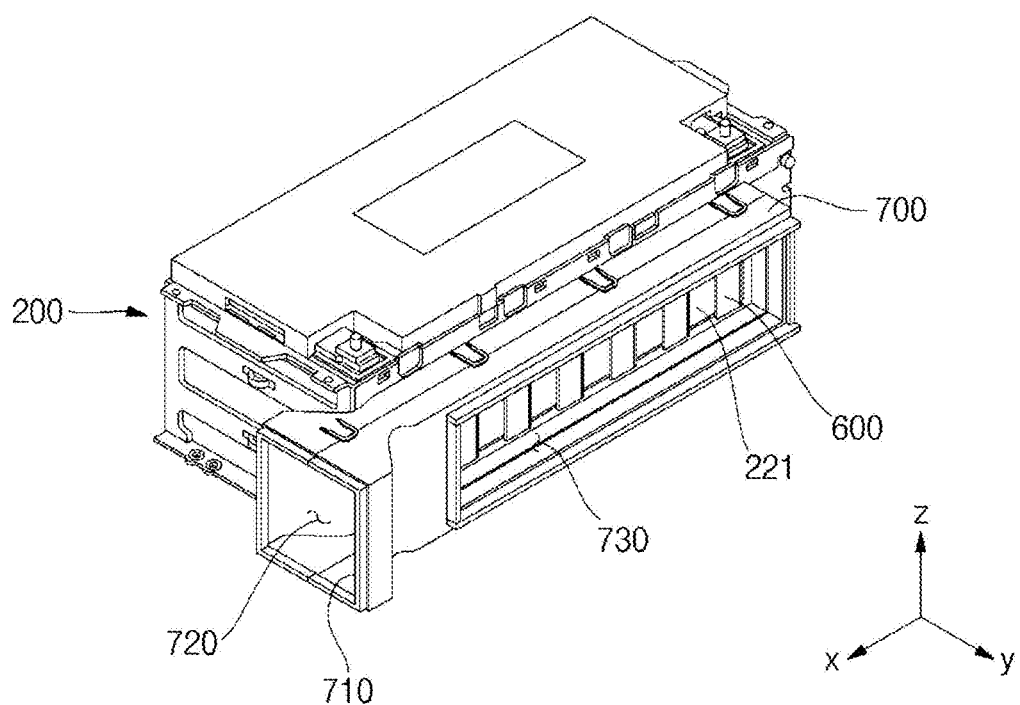
FIG. 12 is a perspective view of a battery pack with a module not shown in the battery pack illustrated in FIG. 11.

Referring to FIGS. 11 and 12, the battery pack 20 includes two modules 200 and a duct 700 interposed therebetween. In addition, a plurality of heat dissipation members 600 are installed in each of the modules 200 so as to face the duct 700.

The heat dissipation members 600 are installed on a side plate (221 of FIG. 4) adjacent to the duct 700 of the module 200. That is, in the current embodiment, the heat dissipation members 600 are installed to face the duct 700, unlike in the previous embodiment in which the heat dissipation members 300 are installed on the side plate opposite to the duct 700. The heat dissipation members 600 are formed to extend from the inside to the outside of the module 200. Therefore, the heat dissipation members 600 can transfer the internal heat of the module 200 to the outside of the module 200. Since the configuration and coupling mechanism of the heat dissipation member 600 may be the same as those of the previous embodiment, repeated descriptions will not be given.

The duct 700 is disposed between the two modules 200. In more detail, the duct 700 is disposed such that its opposite sides face side plates 221 of the modules 200. The duct 700 includes an opening 710 formed at one end to be opened, and the other end of the duct 700, which faces the opening 710, is closed. In addition, the duct 700 includes a path 720 formed therein to allow the air to be induced or discharged.

A heat dissipation hole 730 is formed on each of the opposite sides of the duct 700, i.e., opposite sides of the duct 700 facing the modules 200. Specifically, the heat dissipation hole 730 is formed to wholly correspond to the plurality of the heat dissipation members 600. That is, all extension plates (312 of FIG. 7) of the heat dissipation members 600 are positioned to correspond to the heat dissipation hole 730. Therefore, the heat dissipation members 600 exposed to the outside of the modules 200 can be easily cooled by the air induced into or discharged from the duct 700.

Like in the previous embodiment, a coupling member may be installed in front of the battery pack 20. In addition, like in the previous embodiment, a cooling fan may be installed in the coupling member so as to correspond to the opening 710 of the duct 700. Here, the cooling fan may be of a blow type or a suction type.

As described above, since the battery pack 20 according to another embodiment of the present invention includes the heat dissipation members 600 extended from the inside to the outside of the modules 200, the internal heat of the modules 200 can be easily dissipated to the outside. In addition, the battery pack 20 is configured to further include the duct 700 and the cooling fan, thereby maximizing or increasing the cooling efficiency of the modules 200. Specifically, the heat dissipation members 600 are positioned to correspond to the heat dissipation hole 730 of the duct 700. Therefore, cooling of the heat dissipation members 600 can be efficiently achieved by the air induced into or discharged from the inside of the duct 700. Specifically, in case the duct 700 is of a suction type, the modules 200 are cooled and the heat dissipation members 600 positioned inside the duct 700 are further cooled, thereby achieving efficient heat dissipation.

Hereinafter, measurement results of heat dissipation performance demonstrated when battery packs employ a duct, a cooling fan, and heat dissipation members to will be described.

Table 1 indicates conditions of cooling fans and heat dissipation members employed to battery packs 1 to 4.

TABLE 1

| Battery pack No. | 1 | 2 | 3 | 4 |
|---|---|---|---|---|
| Cooling fan | Suction type | Suction type | Blow type | Suction type |
| Heat dissipation members | — | Installed opposite to duct | Installed opposite to duct | Installed to correspond to heat dissipation holes of duct |

It is noted that the battery packs 1, 2, and 4 employed suction type cooling fans, and the battery pack 3 employed a blow type cooling fan. In addition, no heat dissipation member was installed in the battery pack 1, heat dissipation members were installed opposite to the duct of the module in the battery packs 2 and 3, and heat dissipation members were installed to correspond to the heat dissipation holes of the duct in the battery pack 4.

Figure 13:
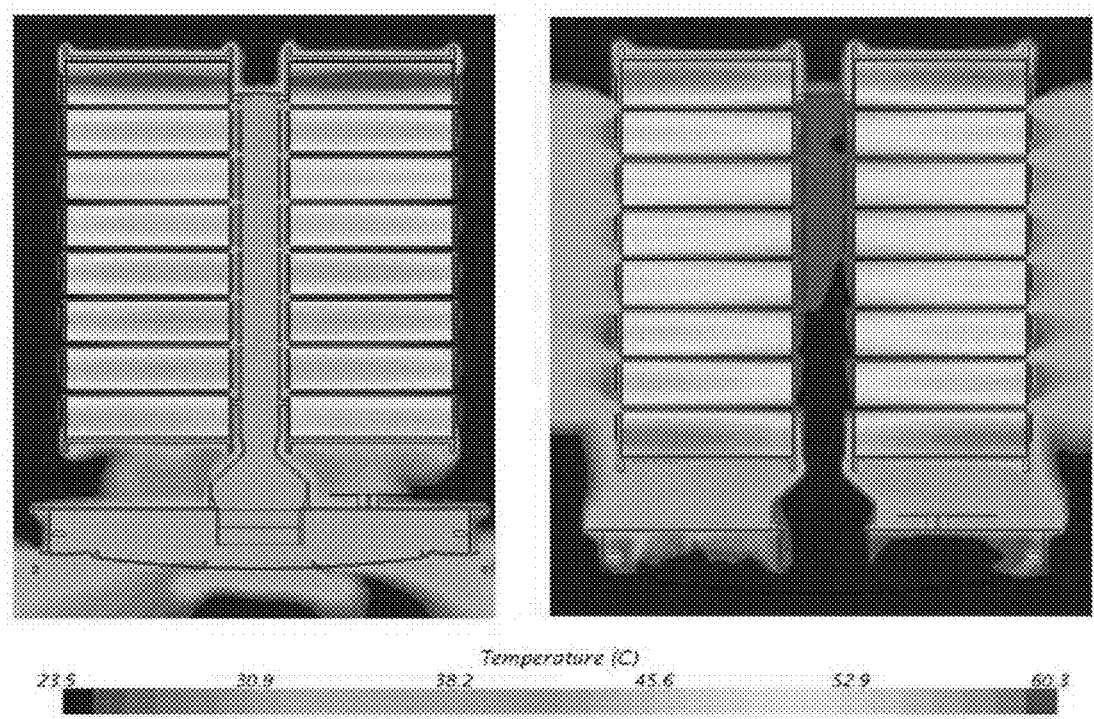
FIG. 13 illustrates temperature distributions in battery packs according to embodiments of the present invention.

FIG. 13 illustrates temperature distributions in battery packs according to embodiments of the present invention. The left illustration of FIG. 13 shows a temperature distribution in the battery pack 1 and the right illustration of FIG. 13 shows a temperature distribution in the battery pack 2.

Referring to FIG. 13, it is confirmed that the temperatures of the battery pack 2 are generally lower than the temperatures of the battery pack 1. In addition, it is confirmed that the overall temperature distribution of unit cells constituting the module is more uniform in the battery pack 2 than in the battery pack 1.

In other words, the battery pack according to the present invention may efficiently improve the performance in heat dissipation by employing the duct and the cooling fan as well as the heat dissipation members. In addition, the battery pack according to the present invention may have improved stability by reducing temperature differences between the unit cells constituting the battery pack.

Table 2 indicates measurement results of average temperatures of the battery packs 2 to 4 for comparison of heat dissipation performance depending on cooling fan types and positions of heat dissipation members installed.

TABLE 2

|  | Battery pack 2 | Battery pack 3 | Battery pack 4 |
|---|---|---|---|
| Temperature (° C.) | 51.3-57.5 | 48.6-55.4 | 51.0-56.5 |

As confirmed from Table 2, in case of the battery pack 2 employing a suction type cooling fan and heat dissipation members installed opposite to the duct, the measured temperatures were distributed in the range of 51.3° C. to 57.5° C. In case of the battery pack 4 employing a suction type cooling fan and heat dissipation members installed to correspond to heat dissipation holes of the duct, the measured temperatures were distributed in the range of 51.0° C. to 56.5° C. In other words, it was confirmed that the battery pack employing a suction type cooling fan demonstrated relatively excellent performance in heat dissipation when the heat dissipation members are positioned to correspond to the heat dissipation holes of the duct.

By contrast, it was confirmed that the battery pack 3 employing a blow type cooling fan and heat dissipation members installed opposite to the duct showed a temperature distribution in the range of 48.6° C. to 55.4° C. In other words, when the battery packs 2 and 3 both having heat dissipation members positioned opposite to the duct were compared with each other, the comparison results indicated that the battery pack employing a blow type cooling fan demonstrated better performance in heat dissipation than the battery pack employing a suction type cooling fan.

Consequently, it can be understood that when a blow type cooling fan and heat dissipation members installed on a side plate of a module positioned opposite to a duct are employed to a battery pack, the battery pack demonstrates highest performance in heat dissipation.

Although the foregoing embodiments have been described to practice the battery pack of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The present invention provides a battery pack including heat dissipation members extended from the inside to the outside of a module to easily dissipate internal heat of the module to the outside, and further including a duct and a cooling fan to maximize or increase cooling efficiency of the module.

The invention claimed is:

1. A battery pack comprising:
   at least one module comprising a plurality of unit cells, a plurality of spacers between the unit cells, and a module case accommodating the unit cells and the spacers;
   a plurality of heat dissipation members in the module and extending from the inside to the outside of the module;
   a duct comprising an opening and provided at a side of the module; and
   a cooling fan connected to the opening of the duct,
   wherein the spacers include a plurality of heat dissipation holes along boundaries between the plurality of unit cells, and
   wherein each of the heat dissipation members comprises:
   a heat dissipation plate comprising an insertion plate inserted into the module to be located between a unit cell of the unit cells and a spacer of the spacers, and an extension plate, the insertion plate extending from an outer perimeter of the extension plate, wherein the insertion plate is inserted into a first heat dissipation hole of the plurality of heat dissipation holes.

2. The battery pack of claim 1, wherein each of the heat dissipation members comprises:
   the heat dissipation plate comprising the insertion plate and the extension plate bent from the insertion plate to extend to the outside of the module; and
   a heat dissipation pad attached to the insertion plate.

3. The battery pack of claim 2, wherein the insertion plate is spaced apart from the unit cell and is in direct contact with the spacer.

4. The battery pack of claim 2, wherein the heat dissipation pad is between the unit cell and the insertion plate.

5. The battery pack of claim 1, wherein the module case includes a pair of side plates covering a pair of unit cell surfaces facing away from each other, and the side plates comprise a plurality of heat dissipation holes corresponding to the plurality of heat dissipation holes of the spacers.

6. The battery pack of claim 5, wherein the heat dissipation members are inserted into the module through the spacers and the heat dissipation holes of the side plates.

7. The battery pack of claim 5, wherein the duct is positioned adjacent to one of the pair of side plates.

8. The battery pack of claim 7, wherein the heat dissipation members are inserted into the module through the heat dissipation holes of the side plate positioned opposite to the duct.

9. A battery pack comprising:
   at least one module comprising a plurality of unit cells, a plurality of spacers between the unit cells, and a module case accommodating the unit cells and the spacers;
   a plurality of heat dissipation members in the module and extending from the inside to the outside of the module;
   a duct comprising an opening and provided at a side of the module; and
   a cooling fan connected to the opening of the duct,
   wherein the spacers include a plurality of heat dissipation holes along boundaries between the plurality of unit cells,
   wherein the module case includes a pair of side plates covering a pair of unit cell surfaces facing away from each other, and the side plates comprise a plurality of heat dissipation holes corresponding to the plurality of heat dissipation holes of the spacers,
   wherein the duct is positioned adjacent to one of the pair of side plates,
   wherein the heat dissipation members are inserted into the module through the heat dissipation holes of the side plate positioned opposite to the duct, and
   wherein the duct includes a plurality of dissipation holes corresponding to the heat dissipation holes of the side plate.

10. The battery pack of claim 7, wherein the heat dissipation members are inserted into the module through the heat dissipation holes of the side plate positioned adjacent to the duct.

11. The battery pack of claim 10, wherein a heat dissipation hole corresponding to the plurality of heat dissipation members is located on one surface of the duct adjacent to the side plate positioned adjacent to the duct.

12. The battery pack of claim 1, wherein the cooling fan is of a blow type or a suction type.

13. A battery pack comprising:
at least one module comprising a plurality of unit cells, a plurality of spacers between the unit cells, and a module case accommodating the unit cells and the spacers;
a plurality of heat dissipation members in the module and extending from the inside to the outside of the module;
a duct comprising an opening and provided at a side of the module; and
a cooling fan connected to the opening of the duct,
wherein the spacers include a plurality of heat dissipation holes along boundaries between the plurality of unit cells,
wherein the heat dissipation members are inserted into the module through the spacers, and
wherein each of the heat dissipation members comprises:
a heat dissipation plate comprising an insertion plate inserted into the module to be located between a unit cell of the unit cells and a spacer of the spacers, and an extension plate, the insertion plate extending from an outer perimeter of the extension plate, wherein the insertion plate is inserted into a first heat dissipation hole of the plurality of heat dissipation holes.

14. A battery pack comprising:
at least one module comprising a plurality of unit cells, a plurality of spacers between the unit cells, and a module case accommodating the unit cells and the spacers;
a plurality of heat dissipation members in the module and extending from the inside to the outside of the module;
a duct comprising an opening and provided at a side of the module; and
a cooling fan connected to the opening of the duct,
wherein the spacers include a plurality of heat dissipation holes along boundaries between the plurality of unit cells, and
wherein each of the heat dissipation members comprises:
a heat dissipation plate comprising an insertion plate inserted into the module to be located between a unit cell of the unit cells and a spacer of the spacers; and
a heat dissipation pad attached to the insertion plate,
wherein the insertion plate is inserted into a first heat dissipation hole of the plurality of heat dissipation holes.

15. The battery pack of claim 1, wherein the insertion plate is a first insertion plate, and the heat dissipation plate further comprises a second insertion plate extending from the outer perimeter of the extension plate and inserted into a second heat dissipation hole of the plurality of heat dissipation holes.

16. The battery pack of claim 13, wherein the insertion plate is a first insertion plate, and the heat dissipation plate further comprises a second insertion plate extending from the outer perimeter of the extension plate and inserted into a second heat dissipation hole of the plurality of heat dissipation holes.

17. The battery pack of claim 14, wherein the insertion plate is a first insertion plate, and the heat dissipation plate further comprises a second insertion plate inserted into a second heat dissipation hole of the plurality of heat dissipation holes.

* * * * *